United States Patent Office.

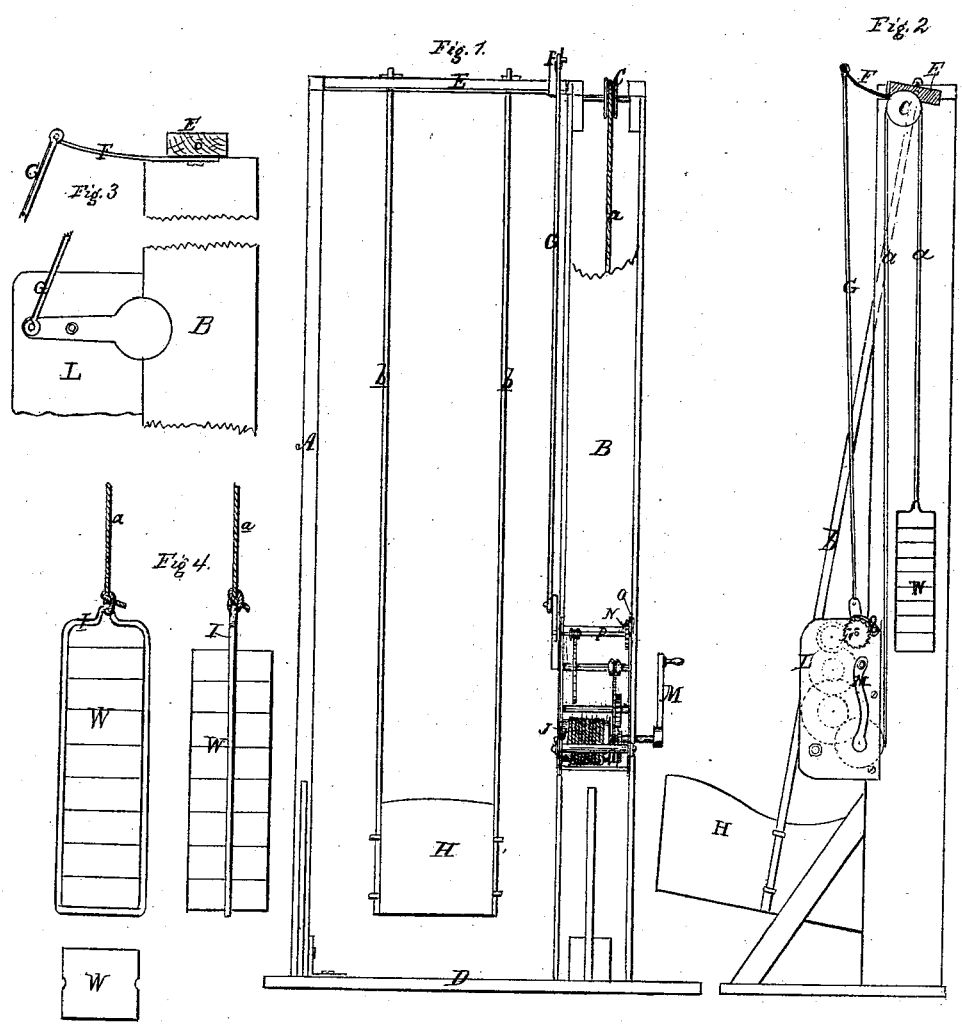

PATRICK P. CARROLL, OF WASHINGTON CITY, DISTRICT OF COLUMBIA.

*Letters Patent No. 76,601, dated April 14, 1868.*

---

IMPROVEMENT IN SWING-CRADLES.

---

The Schedule referred to in these Letters Patent and making part of the same.

---

TO ALL WHOM IT MAY CONCERN:

Be it known that I, PATRICK P. CARROLL, of the city and county of Washington, in the District of Columbia, have invented a new and useful Improvement in Self-Acting Swings; and I do hereby declare the following to be a full, clear, and exact description of the same, reference being had to the drawings accompanying this specification, and forming part of the same, and to the figures and letters thereon, in which—

Figure 1 shows a front view of my invention.

Figure 2, a side view of the same.

Figure 3, a view of the arm or lever by which the cradle is swung, and its connection with the clock-work.

Figure 4, a side, front, and plan view of the weights.

My invention relates to an improved form of swinging cradle, to be used in the nursery, by means of which the labor and care of an attendant may be dispensed with, as the cradle is caused to be swung by a train of clock-work and weights. It is quite simple in its construction, cannot get out of order, noiseless in its operation, and is believed to be the best substitute for the common rocking-cradle ever seen. It may be attached to the wall of any room, requires, when not in use, but very little space, and can be made so cheaply as to place it within reach of all.

In order that others may understand the construction and operation of my invention, I will proceed to particularly describe it.

A and B, fig. 1, represent the posts or supports of the swing, which are made of wood, and B is made hollow to serve as a box for the weight W, which drives the train of clock-work, and is connected therewith by a cord, $a$, passing over the pulley-wheel C at the top of the post B. Where the cradle is to remain as a permanent fixture in the nursery, these posts may be attached to the floor, and form a part of the structure of the room, or, as may be desired, the posts may be framed into a light platform sufficiently large to afford a base for the whole, and then it may easily be removed from one place to another, but perhaps the greatest convenience would be gained by having the post B, with its necessary mechanism, built in the room, and the other parts made so as to be readily removed and replaced. Its portable form is shown in the drawings, where the two posts are connected at the foot by a piece of timber, D, having other pieces extending front and rear, the whole braced and strengthened by angle-irons, and forming a broad and firm base for the support of the whole. At the top of the posts, and resting upon them, in suitable bearings, is the beam E, from which depend the rods $b\ b$, on which the cradle is hung. At the end of the beam E, near the post B, is an arm, F, attached, to which the connecting-rod G is secured, and by which the cradle is caused to swing. This arm F may have a series of holes in it, and the rod G connected therewith by a pin or bolt, so that the length of the said arm may be increased or diminished, and the oscillation of the cradle be made longer or shorter, as desired. It should also be made elastic, so as to prevent imparting to the clock-work any sudden shock, which otherwise would happen at the end of each oscillation of the cradle backwards and forwards. The cradle H is made of any desired form and size, and suspended between the rods $b\ b$, to which it is securely fastened. The lower end of the connecting-rod G is connected with the train of clock-work, as seen in fig. 3. The weights W, fig. 4, are square pieces of cast iron, with grooves upon their opposite edges, so that they may be retained in the frame I, in which they are placed one after another, until their combined weight will be sufficient to perform the desired work. This frame I is made of an iron rod, as seen at fig. 4, and is attached to one end of the cord $a$, which passes over the pulley-wheel C, the other end of the cord being secured to the drum J of the clock-work. The clock-work is contained in a case, L, secured to one side of the post B, and being in all respects like ordinary clock-work, needs no description, except that on the shaft P to which the crank-wrist R is attached, I place a ratchet-wheel, N, and on the case near the same, a holding-latch, O, so as to prevent any backward motion of the parts at any time.

To operate my invention, wind up the weight by the handle M, and then the child being placed in the cradle H, and a gentle start being given to it, it will swing between the two posts until the weight is run down.

Having thus described my invention, what I claim, is—

The spring-arm F, connecting-rod G, and wrist-crank R, as arranged and combined with gear-mechanism for swinging a car or cradle, substantially as and for the purposes herein set forth.

In testimony whereof, I hereunto subscribe my name in the presence of—

P. P. CARROLL.

Witnesses:
    J. B. WOODRUFF,
    GEO. C. GREEN.